(12) United States Patent
Gutt (10) Patent No.: US 8,849,565 B1
(45) Date of Patent: Sep. 30, 2014

(54) NAVIGATION SYSTEM BASED ON NEUTRINO DETECTION

(75) Inventor: Gregory M. Gutt, Ashburn, VA (US)

(73) Assignee: The Boeing Company, Chicago, IL (US)

(*) Notice: Subject to any disclaimer, the term of this patent is extended or adjusted under 35 U.S.C. 154(b) by 861 days.

(21) Appl. No.: 13/069,240

(22) Filed: Mar. 22, 2011

Related U.S. Application Data

(63) Continuation-in-part of application No. 11/770,652, filed on Jun. 28, 2007.

(51) Int. Cl.
*G01C 21/00* (2006.01)
*G01C 21/32* (2006.01)

(52) U.S. Cl.
USPC .............................................. 701/420; 701/1

(58) Field of Classification Search
CPC .................. G08G 1/096811; G08G 1/096872; G01C 21/3629
USPC .................................................... 701/1, 420
See application file for complete search history.

(56) References Cited

U.S. PATENT DOCUMENTS

2013/0293415 A1 * 11/2013 Gutt et al. ................. 342/357.25

OTHER PUBLICATIONS

G. Riccobene, L. Cosentino, G. Pavan, and F. Speziale, "On-line Monitoring of Underwater Acoustic Background at 2000 m Depth", 29th International Cosmic Ray Conference Pune (2005) 00, 101-106.
Lee F. Thompson, "(Towards) a km3 Detector in the Mediterranean Sea", Neutrino 2004 Conference, Paris, Jun. 18, 2004.
E. Andres, et al., "Observation of High-Energy Neutrinos Using Cerenkov Detectors Embedded Deep in Antarctic Ice", Nature Magazine, vol. 410, Mar. 22, 2001, pp. 441-443.
A. Bellerive, "Review of Solar Neutrino Experiments", Ottawa-Charleton Institute for Physics, Dec. 16, 2003.
V. Niess and V. Bertin, "Underwater Acoustic Detection of Ultra High Energy Neutrinos", Centre de Physique des Particules de Marseille.

* cited by examiner

*Primary Examiner* — Ian Jen
(74) *Attorney, Agent, or Firm* — Vista IP Law Group LLP; Cynthia A. Dixon (57) ABSTRACT

A method and system for navigating are disclosed. The method and system comprise detecting neutrinos emitted by a source, measuring the angle of arrival of the neutrinos, and tagging the neutrino measurements utilizing an accurate clock. The method and system further include processing the tagged neutrino measurements through a computational model of a neutrino generator, and combining the processed measurements with navigational aids to provide location information. A system and method in accordance with at least one embodiment measure the angle of arrival of neutrinos generated by the sun, and use this measurement to derive navigational information. The measurement of the angle of arrival of the neutrinos is obtainable deep underground or underwater.

25 Claims, 9 Drawing Sheets

NAVIGATION SYSTEM BASED ON NEUTRINO DETECTION

CROSS-REFERENCE TO RELATED APPLICATION

This application is a Continuation-In-Part application of, and claims the benefit of U.S. patent application Ser. No. 11/770,652, filed Jun. 28, 2007, which is hereby incorporated by reference in its entirety.

FIELD OF THE DISCLOSURE

The present embodiment relates generally to navigation systems, and more particularly to a navigation system based on neutrino detection.

BACKGROUND

Navigation systems are utilized for a variety of entities, such as for aircraft, boats, and submarines. Typically, an inertial navigation system is utilized with a plurality of sensors to provide location information of an entity.

A typical inertial navigation system integrates the information gathered from a combination of gyroscopes and accelerometers in order to determine the current state of the system. Gyroscopes measure the angular velocity of the system in the inertial reference frame. By using the original orientation of the system in the inertial reference frame as the initial condition and integrating the angular velocity, the system's current orientation is known at all times. Accelerometers measure the linear acceleration of the system relative to an inertial reference frame.

However, by tracking both the current angular velocity of the system and the current linear acceleration of the system measured relative to the moving system, it is possible to determine the linear acceleration of the system in the inertial reference frame. Performing integration on the inertial accelerations, while using the original velocity as the initial condition, and using the correct kinematic equations yields the inertial position.

All inertial navigation systems suffer from integration drift. Small errors in the measurement of acceleration and angular velocity are integrated into progressively larger errors in velocity, which is compounded into errors in position. This is a problem that is inherent in every open loop control system.

Inertial navigation may also be used to supplement other navigation systems, providing a higher degree of accuracy than is possible with the use of any single navigation system. For example, if, in terrestrial use, the inertially tracked velocity is intermittently updated to zero by stopping, the position will remain precise for a much longer time, a so-called zero velocity update.

Control theory, in general, and filtering, in particular, provide a theoretical framework for combining information from various sensors. One of the most common alternative sensors is a satellite navigation radio such as a Global Positioning System (GPS). By properly combining the information from an Inertial Navigation System (INS) and the GPS system, the errors in position and velocity are stable.

However, there are some environments where it becomes difficult to address integration drift. For example, on a submarine, it is important to remain underwater for a significant amount of time due to military considerations, and it may be undesirable to resurface within a specified time period. Modern navigation systems require GPS for sustained operations. Accordingly, prolonged GPS outages can severely degrade navigation performance. GPS reception under 100 feet of water becomes difficult, if not impossible, because water attenuates the L-band GPS signal. Therefore, submarines are particularly susceptible to GPS outages during protracted undersea operations. In another example, the vehicle may be underground for an extended period of time where the conventional sensors such as GPS, altimeters, beams, and the like may not be used.

What is needed is a method and system to provide an effective navigation system particularly when a body is underground or under water. The present embodiment addresses such a need.

SUMMARY

The present disclosure relates to a method, system, and apparatus for a navigation using neutrino detection. In one or more embodiments, the disclosed method for obtaining location information involves detecting neutrinos that are emitted by a source, and measuring an angle of arrival of the neutrinos. The method further involves tagging the neutrino measurements utilizing an accurate clock. Also, the method involves processing the tagged neutrino measurements through a computational model of a neutrino generator. Further, the method involves combining the processed measurements with navigational aids to provide the location information. It should be noted that the location information is obtainable deep underground or underwater. Additionally, it should be noted that the method provides robust navigation, without drift, in the absence of other common navigation systems, such as global positioning systems (GPS).

In one or more embodiments, the source is a celestial source. In some embodiments, the celestial source comprises the sun. In other embodiments, the source is a nuclear reactor. The nuclear reactor is land based, based on a submersible vessel, and/or based on a surface vessel. In at least one embodiment, the neutrinos are detected by a neutrino detector. The neutrino detector is land based, based on a submersible vessel, and/or based on a surface vessel.

In one or more embodiments, the navigational aids comprise an inertial navigation system. In at least one embodiment, the navigational aids include a depth gauge, a compass system and/or a sonar system. In some embodiments, the angle of arrival measurement is provided utilizing hydrophone sensors. In one or more embodiments, the computational model comprises an earth-sun computational model.

In at least one embodiment, the method further comprises displaying the location information. In some embodiments, the location information comprises a location of a system being navigated. In at least one embodiment, the location information comprises a location of a system being tracked.

In one or more embodiments of the present disclosure, a computer readable medium contains program instructions for detecting neutrinos that are emitted by a source, and for measuring an angle of arrival of the neutrinos. The program instructions are also for tagging the neutrino measurements utilizing an accurate clock, and processing the tagged neutrino measurements through a computational model of a neutrino generator. Additionally, the program instructions are for combining the processed measurements with navigational aids to provide location information.

In at least one embodiment, a system for obtaining location information involves a neutrino detector for detecting neutrinos that are emitted by a source, and for measuring an angle of arrival of the neutrinos. In at least one embodiment, the system further involves at least one processor for tagging the neutrino measurements utilizing an accurate clock, and for processing the tagged neutrino measurements through a computational model of a neutrino generator. In some embodiments, the system further involves at least one processor for combining the processed measurements with navigational aids to provide the location information.

The disclosed features, functions, and advantages can be achieved independently in various embodiments of the present disclosure, or may be combined in various combinations for other embodiments.

DRAWINGS

These and other features, aspects, and advantages of the present disclosure will become better understood with regard to the following description, appended claims, and accompanying drawings where:

DESCRIPTION

The following description is presented to enable one of ordinary skill in the art to make and use the embodiment and is provided in the context of a patent application and its requirements. Various modifications to the embodiments and the generic principles and features described herein will be readily apparent to those skilled in the art. Thus, the present embodiment is not intended to be limited to the embodiments shown, but is to be accorded the widest scope consistent with the principles and features described herein.

At any given location on the surface of the Earth there is a unique angular relationship to the sun which is well understood and can be captured within an accurate sun-earth model. If one provides time into the model and angle of arrival information (as measured by a user on the earth), there is a unique position associated with those measurements. The only other information required is the direction of the local vertical. Heading can then be derived by making several observations over time.

It is known that the sun generates atomic particles known as neutrinos, which only weakly interact with matter. Neutrinos are able to penetrate the Earth completely with negligible interference. Neutrinos are elementary particles that carry no electric charge, and have little mass. As they interact only weakly with other particles, they can penetrate enormous amounts of matter and, therefore, have the potential to directly convey astrophysical information from the edge of the Universe and from deep inside the most cataclysmic high-energy regions.

Methods disclosed for neutrino detection systems are described, for example, in "Underwater Acoustic Detection of Ultra High Neutrinos," V. Niess and V. Bertin; "Observation of high-energy neutrinos using Cerenkov detectors embedded deep in Antartic ice," E. Andres, et al., Nature, vol. 410, Mar. 22, 2001; "Review of Solar Neutrino Experiments," A. Bellerive, arxiv:hep-ex/0312045, v. 1, Dec. 16, 2003; and "On-line monitoring of underwater acoustic background at 2000 m depth," G. Riccobene, et al., 29.sup.th International Cosmic Ray Conference Pune (2005) 00, 101-106, all of which are expressly incorporated herein by reference.

Figure 1:
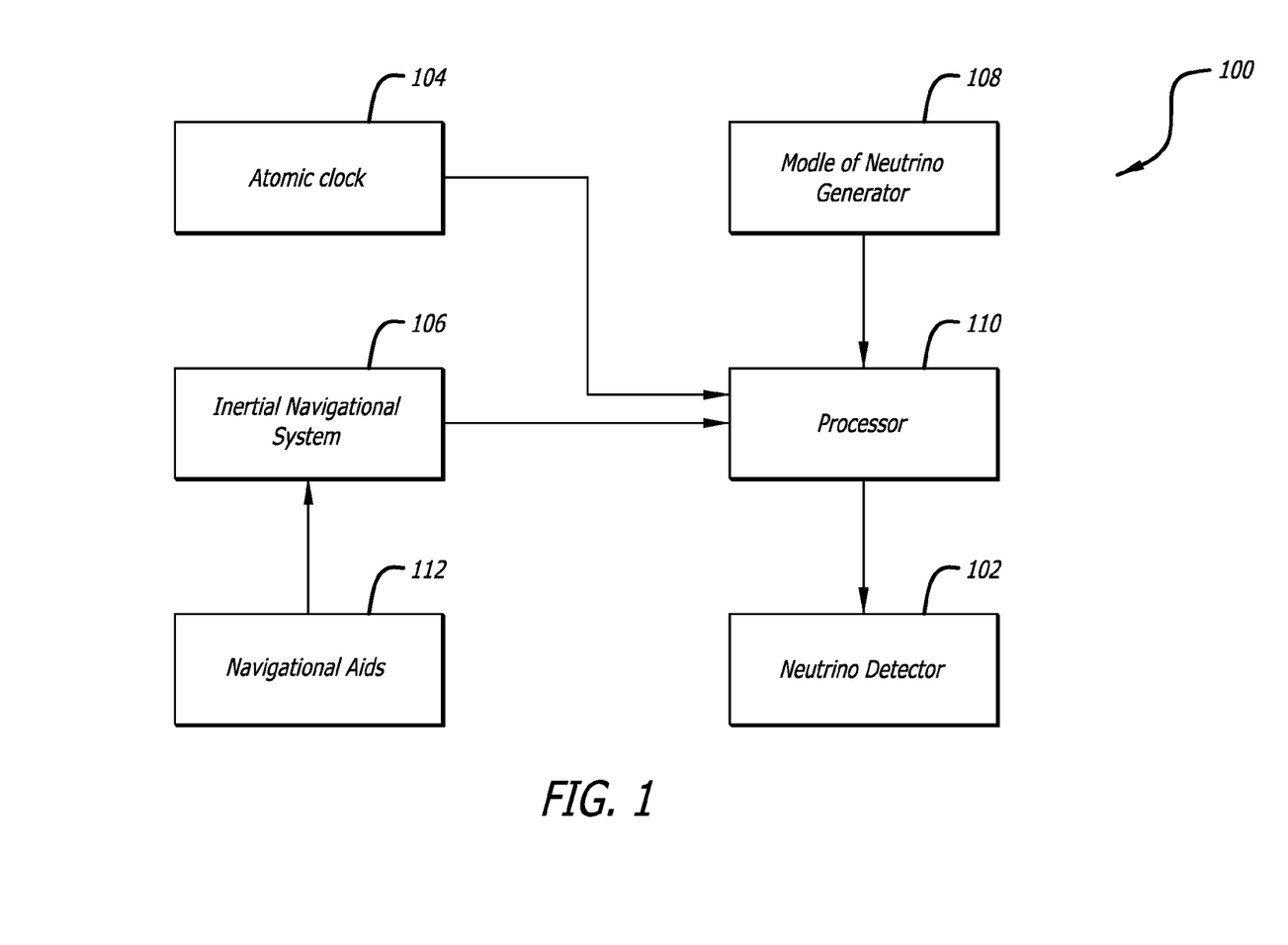
FIG. 1 illustrates a simplified block diagram of the elements for a navigation system 100, in accordance with at least one embodiment of the present disclosure.

FIG. 1 illustrates a simplified block diagram of the elements for a navigation system 100, in accordance with at least one embodiment of the present disclosure. The navigation system 100 comprises an accurate clock (e.g., an atomic clock 104), an inertial navigational system 106, navigational aids 112, a computational model of a neutrino generator 108, a processor 110, and a neutrino detector 102.

Accordingly, neutrino radiation is detected utilizing the neutrino detector 102. Neutrino detection can be accomplished, for example, by using hydrophone sensors, as are described in the above-identified disclosures. The neutrino detector 102 measurements are then tagged with time information using an accurate clock, such as atomic clock 104. The tagged neutrino measurements are then processed by the processor 110 utilizing the computational model of a neutrino generator 108. The signals from a precise inertial navigation system and from the navigational aids are then combined with information from the system 106 utilizing processor 110. Navigational aids include, but are not limited to, a depth gauge, an altimeter, a compass, a vision system and a sonar system.

Therefore, the combined system produces location information with suitable accuracy for a system such as an underwater or underground vehicle, without the use of GPS or other means. This can contribute to the stealth of missions and of course supplement operations if GPS is non-operational. To describe a method of navigation utilizing the system 100 in accordance with the present embodiment in more detail, refer to the following description of FIG. 2 in conjunction with the accompanying figures.

Figure 2:
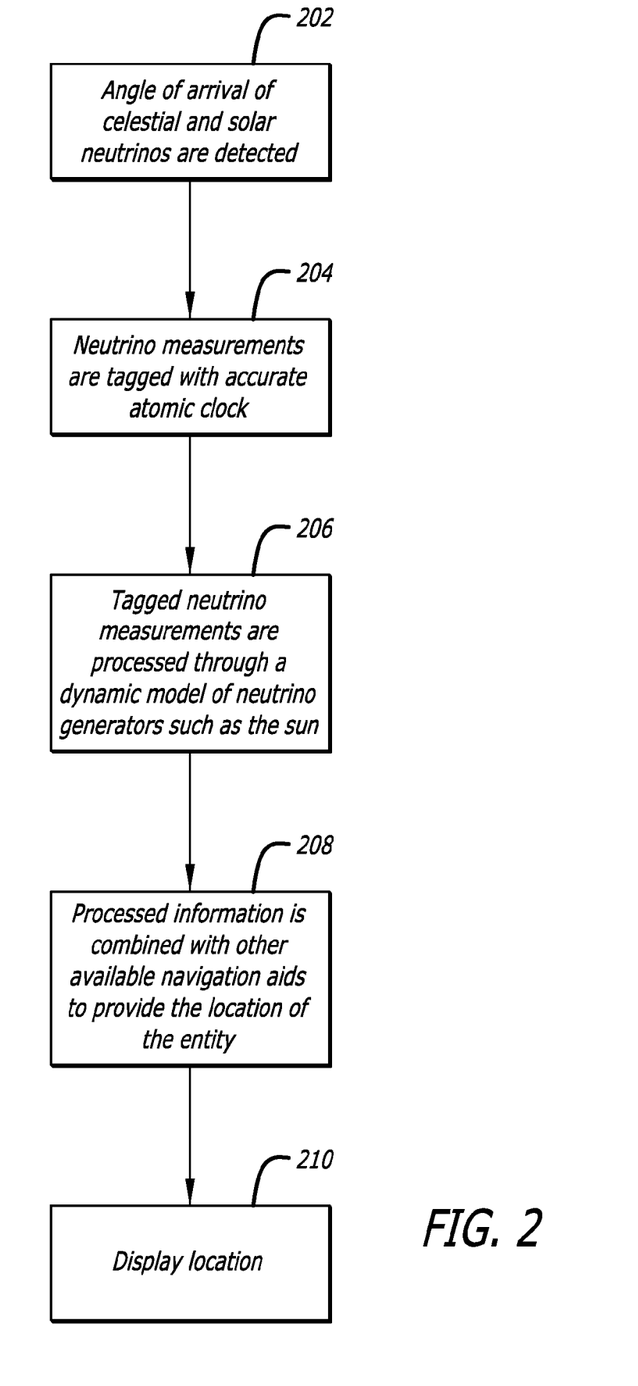
FIG. 2 is a flow chart of a method for navigation using neutrinos emitted from a celestial source, in accordance with at least one embodiment of the present disclosure.

FIG. 2 is a flow chart 200 of a method for navigation using neutrinos emitted from a celestial source, in accordance with at least one embodiment of the present disclosure. At the start of the method, the angles of arrival of celestial and solar neutrinos are detected 202. These measurements can be made simultaneously over a given geometry to obtain additional information. For example, the angle of arrival of the solar neutrinos may be measured periodically to produce heading information. Measurements can also be taken continuously over time so that coherent integration techniques can be applied synchronous with the Earth's rotation.

Next, the neutrino measurements are tagged with a time stamp using an accurate clock 204. The accurate clock could be, for example, the atomic clock 104.

The neutrino angle of arrival and clock information are then processed through a computational model of a neutrino generator 206. For example, the neutrino generator could be a celestial source, such as the sun. Neutrinos from other celestial sources, such as distant stars, can also be utilized for the computational model. In another example, a device that emits neutrinos, such as a nuclear submarine, can be located via this process. The model should account for rotation, and other known dynamic effects, such as general and special relativity.

The processed information is then combined with other available navigational aids to provide the location of the entity 208. The navigational aids include, but are not limited to, inertial navigation, altimeter, depth gauge, radar, vision, and radio navigation systems. In one example, the integration of this information is processed utilizing a Kalman filter. In one embodiment, the outputs such as latitude, longitude, altitude and estimate of navigation efforts and biases in the system are filtered to further refine the location.

The navigation information is then displayed for the user and/or communicated to other systems as required 210.

Figure 3:
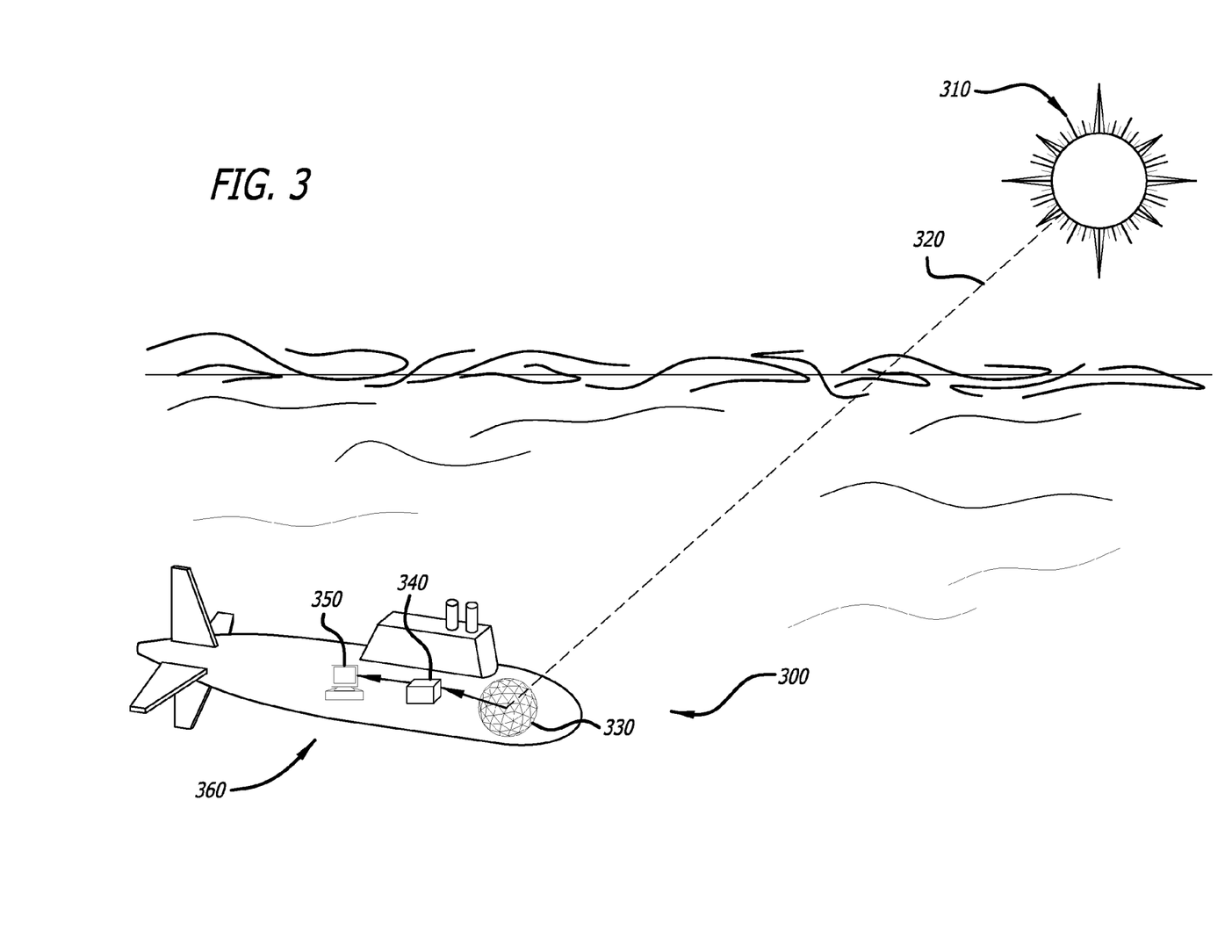
FIG. 3 illustrates the disclosed system utilizing a neutrino detector in a submersible vessel for navigation, in accordance with at least one embodiment of the present disclosure.

FIG. 3 illustrates the disclosed system 300 utilizing a neutrino detector 330 in a submersible vessel 360 for navigation, in accordance with at least one embodiment of the present disclosure. In this figure, a known neutrino source 310 is shown to emit neutrinos 320. The neutrino source 310 in this figure is the sun. However, it should be noted that other types of sources 310 may emit the neutrinos 320 including, but not limited to, various types of celestial bodies and nuclear reactive materials.

The neutrinos 320 are able to pass through water and all types of materials. The neutrino detector 330 on the submersible vessel 360 detects the neutrinos 320 that have passed through the water to the submersible vessel 360. It should be noted that various types of submersible vessels 360 may be employed by the disclosed system 300 including, but not limited to, submarines. In alternative embodiments, an underground vehicle may be employed by the disclosed system instead of a submersible vessel 360.

The neutrino detector 330 also determines the neutrinos' 320 angle of arrival. The detector material, which includes the detector 330 itself as well as the surrounding water, emits photons when the neutrinos 320 react with the detector material. The neutrino detector 330 is able to determine the angle of arrival of the neutrinos 320 by observing the direction that the photons are emitted by the detector material when the neutrinos 320 react with the detector material.

The angle of arrival of the neutrinos 320 is combined with navigation aids 340 to calculate the location (e.g., latitude, longitude, and depth) of the submersible vessel 360. Types of navigation aids 340 that may be utilized by the disclosed system 300 include, but are not limited to, an inertial navigation system, a depth gauge, a compass system, and a sonar system.

Once the location of the submersible vessel 360 is calculated, it can be displayed on a display device 350 to a user located inside of the submersible vessel 360. It should be noted that the disclosed system 300 is able to be fully functional during all times of the day and night as well as during all weather conditions because the neutrinos 320 are able to readily pass through all materials, including the Earth itself.

Figure 4:
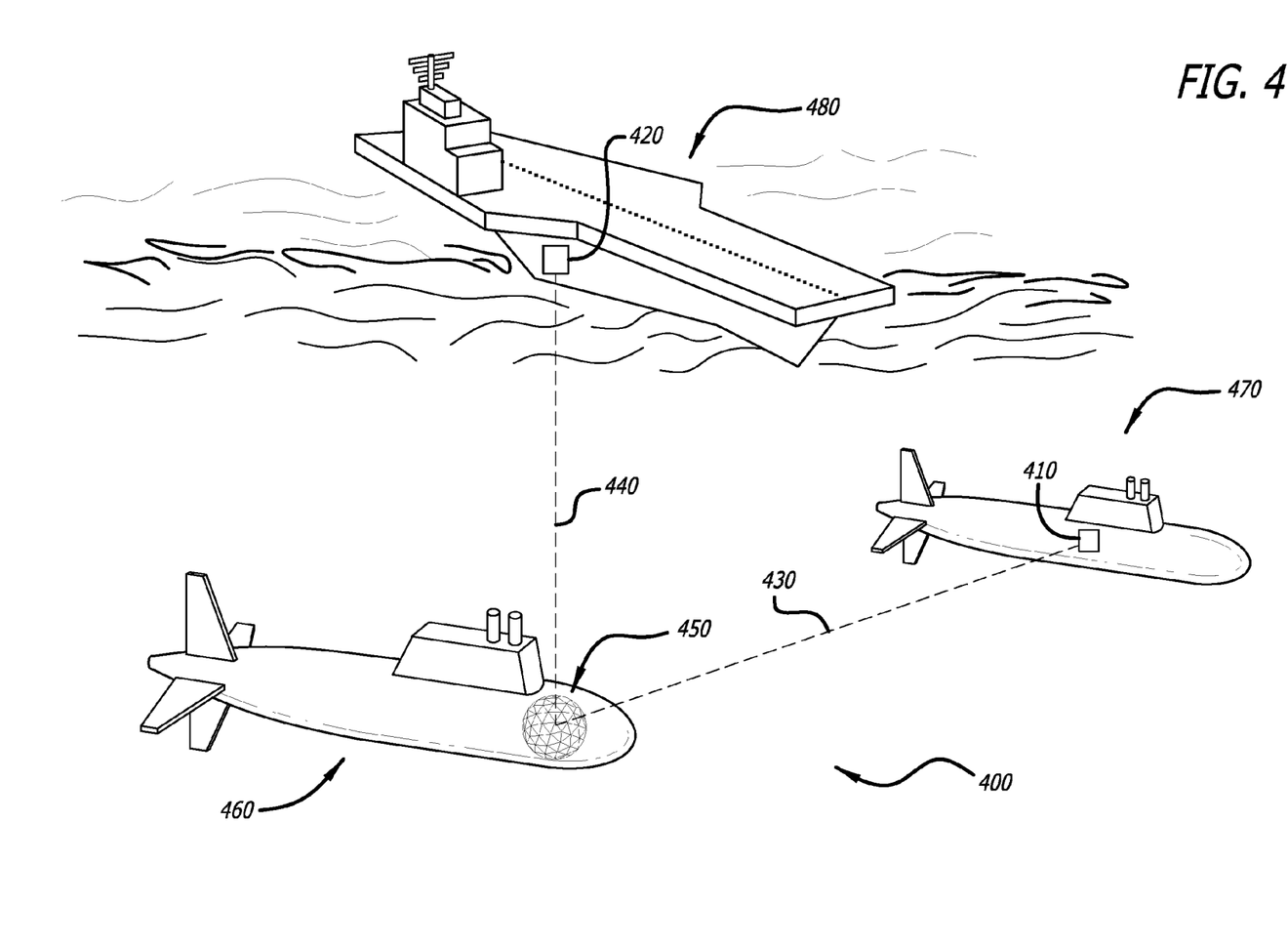
FIG. 4 depicts the disclosed system utilizing a neutrino detector in a submersible vessel for detecting and tracking nuclear reactors, in accordance with at least one embodiment of the present disclosure.

FIG. 4 depicts the disclosed system 400 utilizing a neutrino detector 450 in a submersible vessel 460 for detecting and tracking nuclear reactors 410, 420, in accordance with at least one embodiment of the present disclosure. In this figure, nuclear reactors 410, 420, which are respectively located in a submersible vessel 470 (e.g., a submarine) and a surface vessel 480 (e.g., an aircraft carrier), are shown to emit neutrinos 430, 440. A neutrino detector 450 on the submersible vessel 460 detects the neutrinos 430, 440 that are emitted by the nuclear reactors 410, 420.

The neutrino detector 450 tracks the change in the angle of arrival of the neutrinos 430, 440 over time, and the change in the intensity of the neutrinos 430, 440 over time. This information is processed along with any noted change in the location of the detector 450 over time in order to determine and track the location of the nuclear reactors 410, 420. It should be noted that neutrino detection is virtually impossible to avoid because, unlike most radiation, neutrinos cannot be shielded. In other embodiments of the present disclosure, neutrino detectors can be incorporated in various types of surface vessels and/or located at various strategic land locations, such as harbors or shipping straits.

Figure 5:
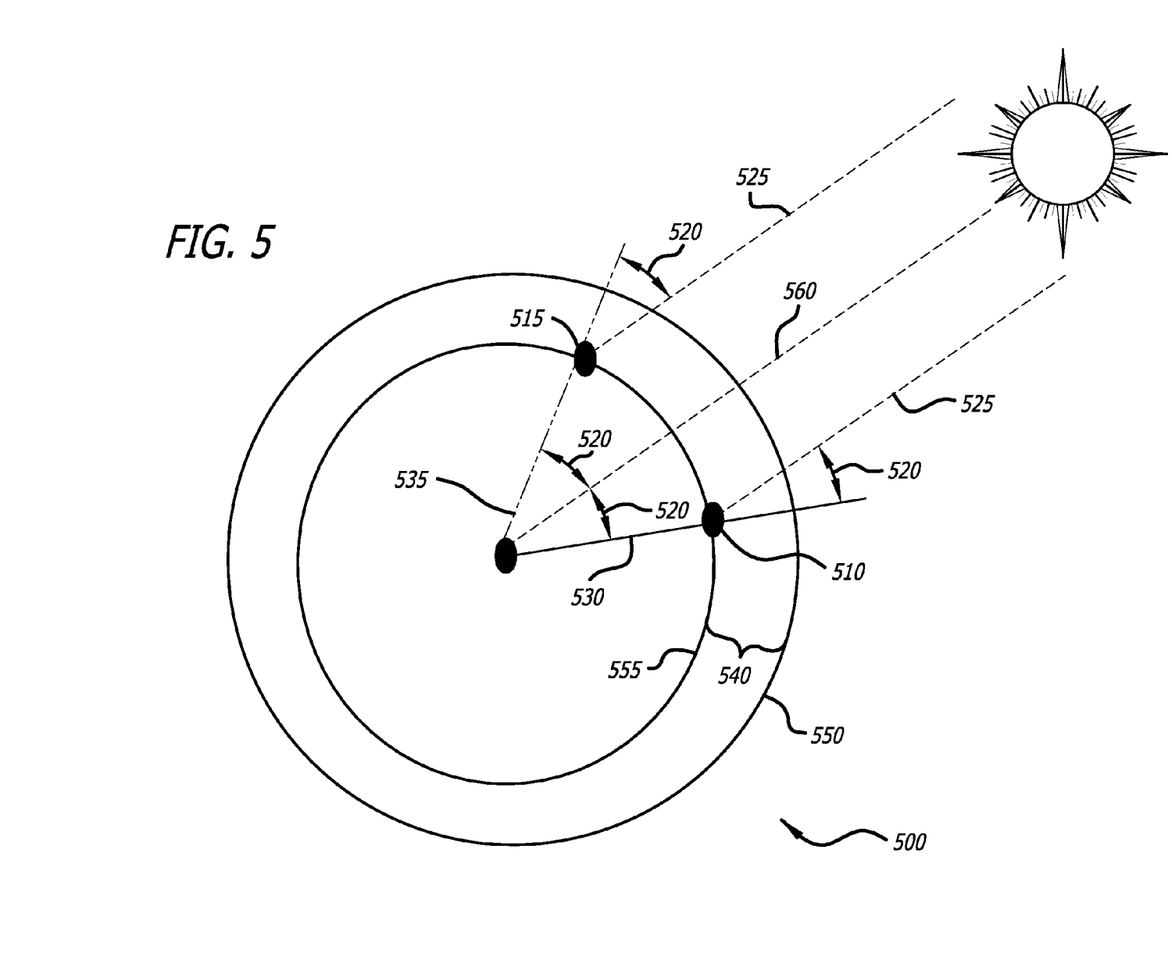
FIG. 5 shows a two-dimensional view of the geometry for a method using the angle of arrival of the neutrinos to aid in navigation, in accordance with at least one embodiment of the present disclosure.

FIG. 5 shows a two-dimensional view of the geometry 500 for a method using the angle of arrival of the neutrinos to aid in navigation, in accordance with at least one embodiment of the present disclosure. In this figure, an observer 510 measures the angle 520 between the observer's sun line 525 and the observer's local vertical 530. As shown in this figure, any observer (e.g., 510 and 515) that is located along local vertical 530 or local vertical 535 will measure the same angle 520 between the observer's sun line 525 and the observer's local vertical 530, 535.

A measurement of the amount of depth 540 that the observer 510 is located below the Earth's surface 550 is used in order to place the observer 510 on a circle 555 located below the Earth's surface 550. As the sun rotates around the Earth over the duration of the day, an accurate clock is used to determine the direction (e.g., longitude and latitude angles) towards the sun 560.

A specific direction (e.g., North) is used to determine whether the observer is actually located at point 510 or point 515. By comparing the direction of the sun to a specific direction (e.g., North), the observer location can be determined depending upon whether the sun lies to the right of North or to the left of North. For this figure, we are assuming that the sun lies to the right of North and, thus, it is determined that the observer is located at point 510, and not at point 515.

Figure 6:
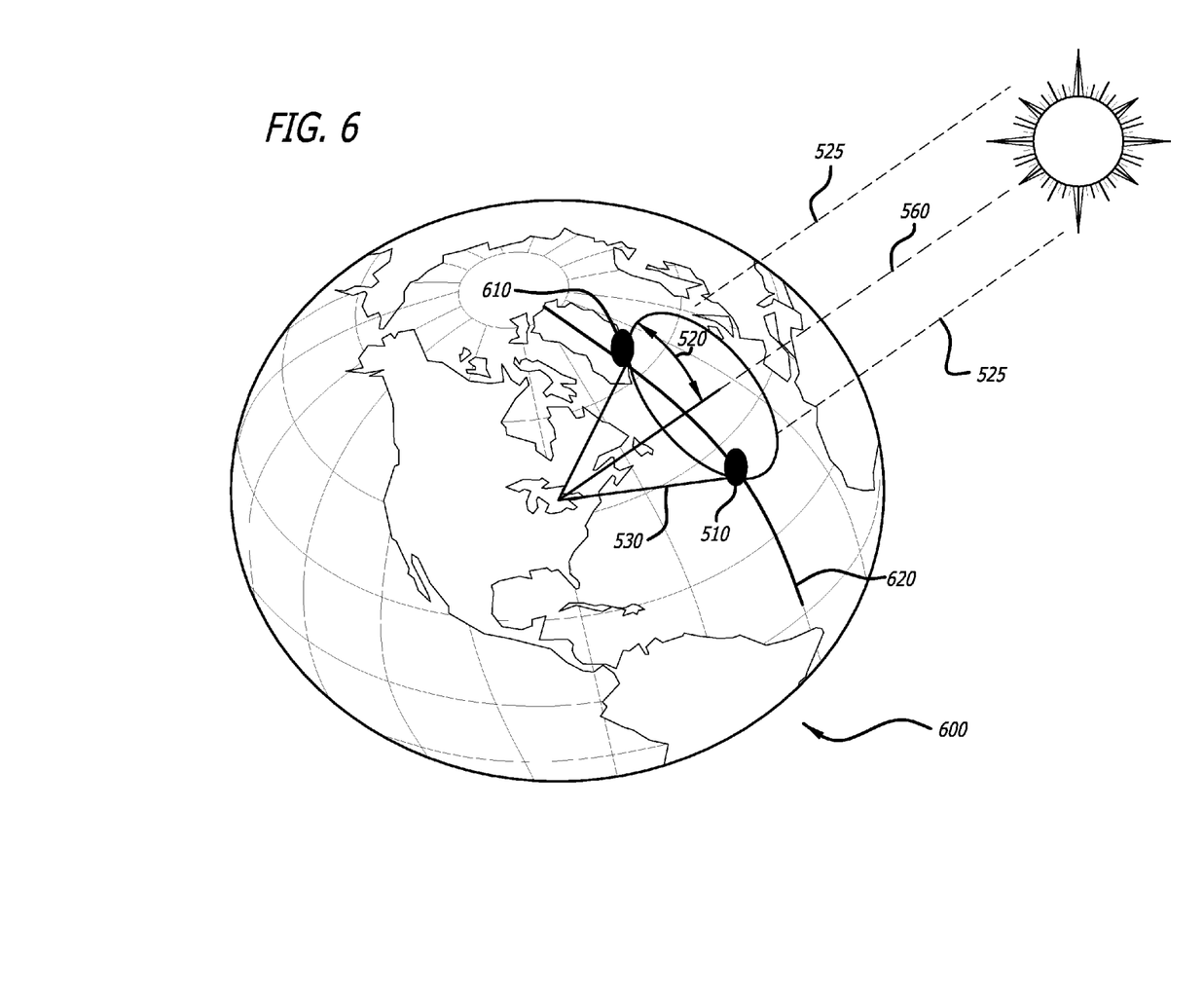
FIG. 6 shows a three-dimensional view of the geometry for a method using the angle of arrival of the neutrinos to aid in navigation, in accordance with at least one embodiment of the present disclosure.

FIG. 6 shows a three-dimensional view of the geometry 600 for a method using the angle of arrival of the neutrinos to aid in navigation, in accordance with at least one embodiment of the present disclosure. In this figure, an observer 510 measures the angle 520 between the observer's sun line 525 and the observer's local vertical 530. As shown in this figure, any observer located on the surface of a cone, which has an axis along the direction of the sun 560 and a cone angle 520, will measure the same angle 520 between the observer's sun line 525 and the observer's local vertical.

As the sun rotates around the Earth over the duration of the day, an accurate clock is used to determine the direction (e.g., longitude and latitude angles) towards the sun 560. A specific longitude line 620 is calculated using the time of day. The intersections of the cone and the longitude line 620 place an observer at location 510 or 610.

A specific direction (e.g., North) is used to determine whether the observer is actually located at point 510 or point 610. By comparing the direction of the sun to a specific direction (e.g., North), the observer location can be determined depending upon whether the sun lies towards the North or towards opposite of the North (i.e. the South). In this figure, since the sun is shown to lie to the North, it is determined that the observer is located at point 510, and not at point 610.

Figure 7:
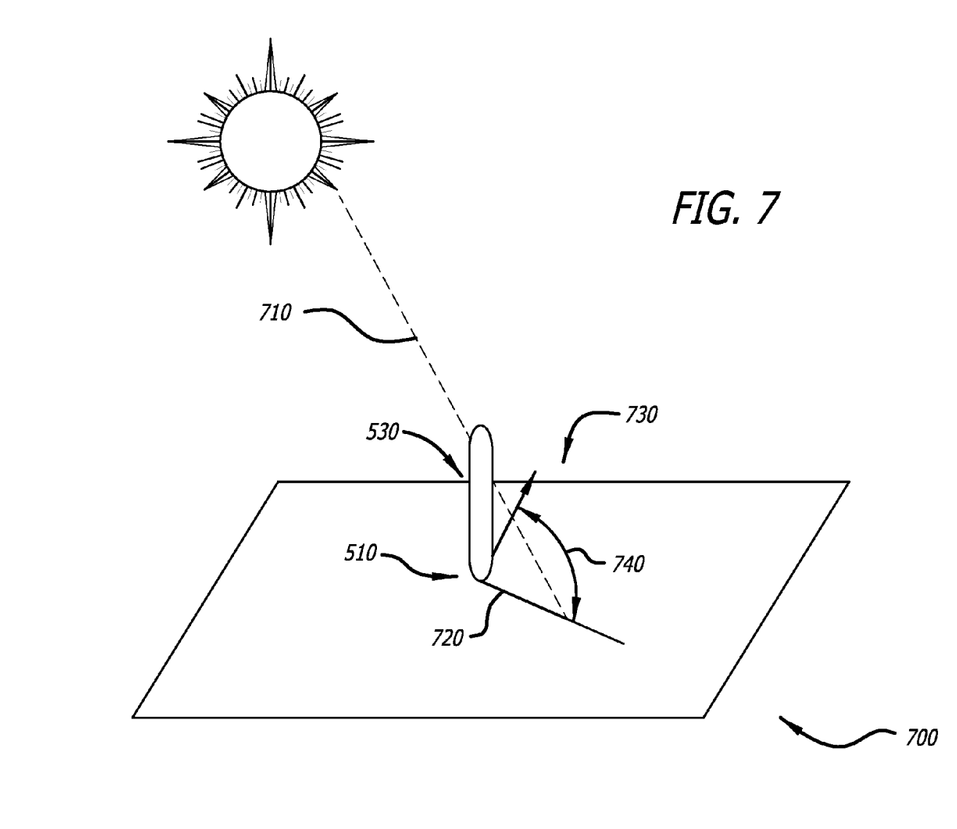
FIG. 7 illustrates the three-dimensional view of the geometry for the process of a sundial, which is similar to the navigation methods depicted in FIGS. 5 and 6.

FIG. 7 illustrates the three-dimensional view of the geometry for the process of a sundial 700, which operates similarly to the navigation methods depicted in FIGS. 5 and 6. A sundial uses location and sun angle to determine time, whereas the navigation methods of FIGS. 5 and 6 use time and sun angle to determine location. In order to better understand of the navigation methods illustrated in FIGS. 5 and 6, a description of the general operation of a sundial is presented.

In FIG. 7, a sundial 700 is used to determine the local time at a known location 510. Light 710 from the sun casts a shadow 720 of the local vertical 530 of the sundial 700. Given a known location 510, the local time can be determined from the angle 740, which is located between the local North 730 and the local vertical shadow 720. This angle 740 is unique for its specific location 510.

Figure 8:
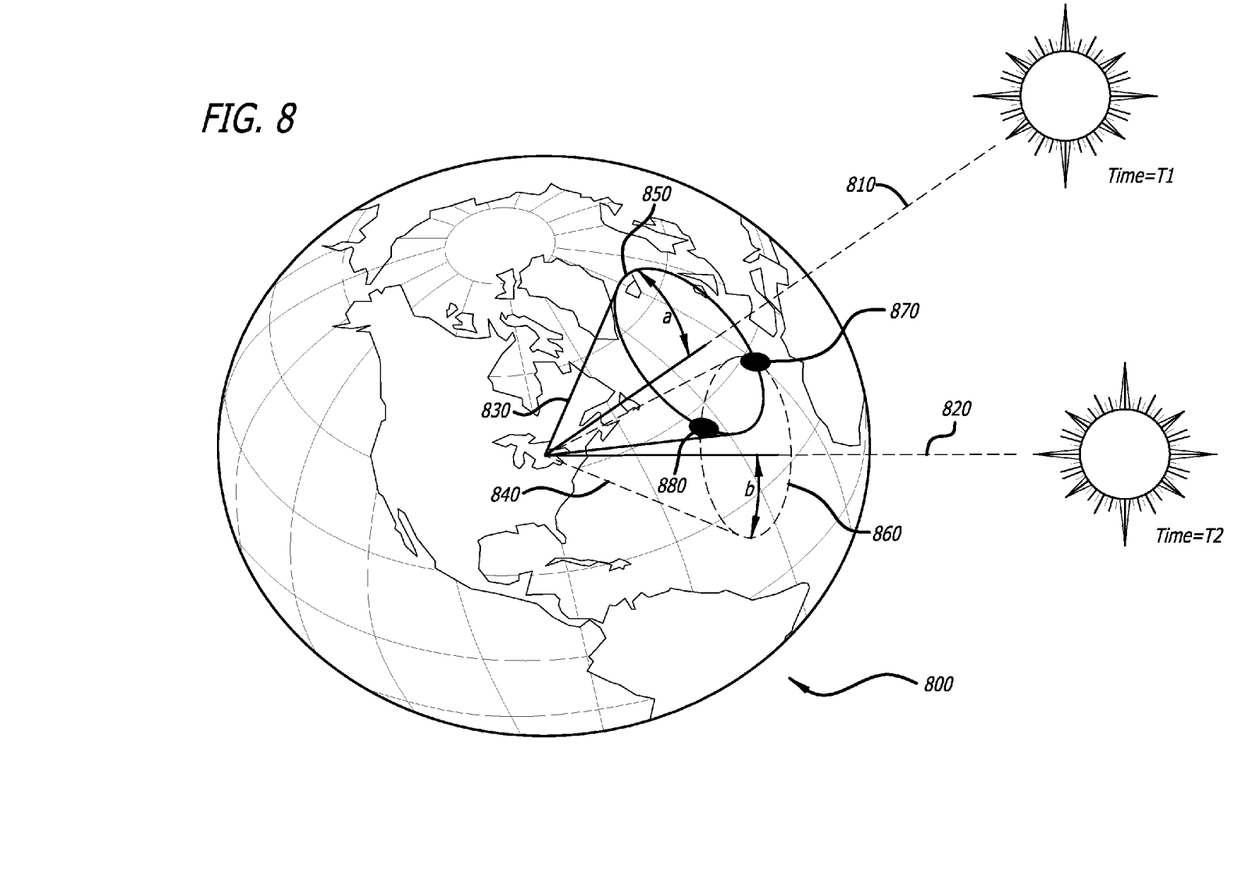
FIG. 8 shows a three-dimensional view of the geometry for a method using two angles of arrival of the neutrinos to aid in navigation, in accordance with at least one embodiment of the present disclosure.

FIG. 8 shows a three-dimensional view of the geometry 800 for a method using two angles of arrival (angle a and angle b) of the neutrinos 810, 820 to aid in navigation, in accordance with at least one embodiment of the present disclosure. In this figure, two angles of arrival (angle a and angle b) of the neutrinos 810, 820 are used to determine the observer's location.

At time equal to T1, the angle measured between the sun line 810 and the local vertical 830 is angle a. At this time, the observer is placed on cone 850, which has a cone angle equal to angle a. At time T2, the angle measured between the sun line 820 and the local vertical 840 is angle b. At this time, the observer is placed on the cone 860, which has a cone angle equal to angle b. As such, the observer must be located on the intersection of cones 850 and 860. Thus, in this figure, the observer is located at location 870 or 880. These two locations are usually sufficiently separated so that there is no ambiguity. However, if there is ambiguity, a specific direction (e.g., North) can be used, as was previously described, to resolve the ambiguity.

Figure 9:
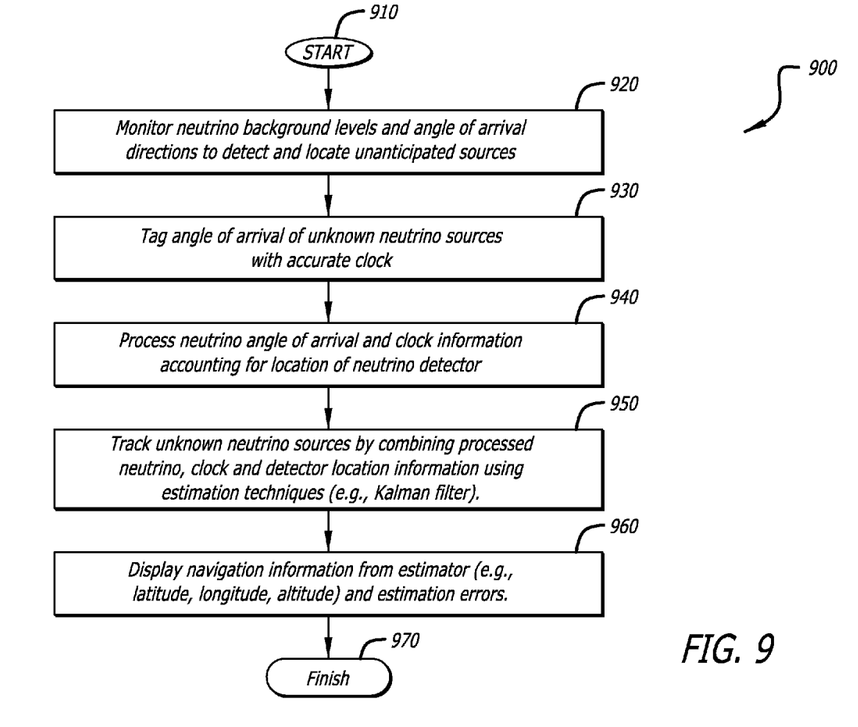
FIG. 9 is flow chart of a method for detecting and tracking nuclear sources, in accordance with at least one embodiment of the present disclosure.

FIG. 9 is flow chart 900 of a method for detecting and tracking nuclear sources, in accordance with at least one embodiment of the present disclosure. At this start 910 of this method, neutrino background levels and the angle of arrival of the neutrinos are monitored in order to detect and locate unanticipated neutrino sources 920 (e.g., nuclear sources). Then, the angle of arrival of the neutrinos, which is emitted from these unknown sources, is tagged with a time stamp using an accurate clock 930. After the angle of arrival of the neutrinos is tagged with a time stamp, the neutrino angle of arrival along with clock information that accounts for the location of the neutrino detector is processed 940. Then, the processed neutrino angle of arrival, clock, and detector location information is combined using estimation techniques (e.g., a Kalman filter) in order to track the unknown neutrino sources 950. Navigation information (e.g., latitude, longitude, and altitude) of the neutrino sources, which is generated from the estimator, along with estimation errors are then displayed on a display device to a user 960. After the navigation information of the neutrino sources is displayed to the user, the method ends 970.

Although the present embodiment has been described in accordance with the embodiments shown, one of ordinary skill in the art will readily recognize that there could be variations to the embodiments and those variations would be within the spirit and scope of the present embodiment. Accordingly, many modifications may be made by one of ordinary skill in the art without departing from the spirit and scope of the appended claims.

I claim:

1. A method for obtaining location information, the method comprises:
   detecting neutrinos that are emitted by a source;
   measuring an angle of arrival of the neutrinos;
   tagging the neutrino measurements utilizing an accurate clock;
   processing the tagged neutrino measurements through a computational model of a neutrino generator; and
   combining the processed measurements with navigational aids to provide the location information.

2. The method of claim 1, wherein the source is a celestial source.

3. The method of claim 2, wherein the celestial source comprises the sun.

4. The method of claim 1, wherein the source is a nuclear reactor,
   wherein the nuclear reactor is one of land based, based on a submersible vessel, and based on a surface vessel.

5. The method of claim 1, wherein the neutrinos are detected by a neutrino detector,
   wherein the neutrino detector is one of land based, based on a submersible vessel, and based on a surface vessel.

6. The method of claim 1, wherein the navigational aids comprise an inertial navigation system.

7. The method of claim 1, wherein the navigational aids include at least one of a depth gauge, a compass system, and a sonar system.

8. The method of claim 1, wherein the angle of arrival measurement is provided utilizing hydrophone sensors.

9. The method of claim 1, wherein the computational model comprises an earth-sun computational model.

10. The method of claim 1, wherein the method further comprises displaying the location information.

11. The method of claim 1, wherein the location information comprises a location of a system being navigated.

12. The method of claim 1, wherein the location information comprises a location of a system being tracked.

13. A computer readable medium containing program instructions, the program instructions for:
   detecting neutrinos that are emitted by a source;
   measuring an angle of arrival of the neutrinos;
   tagging the neutrino measurements utilizing an accurate clock;
   processing the tagged neutrino measurements through a computational model of a neutrino generator; and
   combining the processed measurements with navigational aids to provide location information.

14. A system for obtaining location information, the system comprises:
   a neutrino detector for detecting neutrinos that are emitted by a source, and for measuring an angle of arrival of the neutrinos; and
   at least one processor for tagging the neutrino measurements utilizing an accurate clock, and for processing the tagged neutrino measurements through a computational model of a neutrino generator, and
   the at least one processor further used for combining the processed measurements with navigational aids to provide the location information.

15. The system of claim 14, wherein the source is a celestial source.

16. The system of claim 15, wherein the celestial source comprises the sun.

17. The system of claim 14, wherein the source is a nuclear reactor,
  wherein the nuclear reactor is one of land based, based on a submersible vessel, and based on a surface vessel.

18. The system of claim 14, wherein the neutrino detector is one of land based, based on a submersible vessel, and based on a surface vessel.

19. The system of claim 14, wherein the navigational aids comprise an inertial navigation system.

20. The system of claim 14, wherein the navigational aids include at least one of a depth gauge, a compass system, and a sonar system.

21. The system of claim 14, wherein neutrino detector obtains the angle of arrival measurement by utilizing hydrophone sensors.

22. The system of claim 14, wherein the computational model comprises an earth-sun computational model.

23. The system of claim 14, wherein the system further comprises a display device for displaying the location information.

24. The system of claim 14, wherein the location information comprises a location of a system being navigated.

25. The system of claim 14, wherein the location information comprises a location of a system being tracked.

\* \* \* \* \*